(12) United States Patent
Flaks et al.

(10) Patent No.: US 8,767,968 B2
(45) Date of Patent: Jul. 1, 2014

(54) SYSTEM AND METHOD FOR HIGH-PRECISION 3-DIMENSIONAL AUDIO FOR AUGMENTED REALITY

(75) Inventors: Jason Flaks, Redmond, WA (US); Avi Bar-Zeev, Redmond, WA (US); John Tardif, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 344 days.

(21) Appl. No.: 12/903,610

(22) Filed: Oct. 13, 2010

(65) Prior Publication Data

US 2012/0093320 A1    Apr. 19, 2012

(51) Int. Cl.
*H04R 5/00* (2006.01)
*H04R 5/02* (2006.01)
*G09G 5/00* (2006.01)

(52) U.S. Cl.
USPC .............................. 381/17; 381/310; 345/633

(58) Field of Classification Search
USPC ..................................... 381/17, 310; 345/633
See application file for complete search history.

(56) References Cited

U.S. PATENT DOCUMENTS

| | | | |
|---|---|---|---|
| 5,715,317 A | 2/1998 | Nakazawa | |
| 6,500,008 B1 * | 12/2002 | Ebersole et al. | 434/226 |
| 7,953,275 B1 * | 5/2011 | Wolfram | 382/167 |
| 2006/0105838 A1 * | 5/2006 | Mullen | 463/31 |
| 2008/0046246 A1 * | 2/2008 | Goldstein et al. | 704/258 |
| 2009/0214045 A1 * | 8/2009 | Fukui et al. | 381/17 |
| 2010/0080396 A1 | 4/2010 | Aoyagi | |
| 2010/0241256 A1 * | 9/2010 | Goldstein et al. | 700/94 |
| 2010/0278232 A1 * | 11/2010 | Yea et al. | 375/240.08 |
| 2011/0047503 A1 * | 2/2011 | Allen et al. | 715/784 |

FOREIGN PATENT DOCUMENTS

WO    WO 2011/011438    *    1/2011    ............... H04R 7/00

OTHER PUBLICATIONS

Zotkin et al., "Virtual audio system customization using visual matching of ear parameters", 2002, IEEE.*
Toyama, Kentaro, et al., "Probabilistic Tracking in a Metric Space," Eighth International Conference on Computer Vision, Vancouver, Canada, vol. 2, Jul. 2001, 8 pages.
Algazi, et al. "Structural Composition and Decomposition of HRTFS." Proceedings of the 2001 Institute of Electrical and Electronics Engineers Workshop on Applications of Signal Processing to Audio and Acoustics (WASPAA'01), Oct. 21-24, 2001, pp. 1-4, New Paltz, New York, USA.

(Continued)

*Primary Examiner* — Ahmad Matar
*Assistant Examiner* — Katherine Faley
(74) *Attorney, Agent, or Firm* — Vierra Magen Marcus LLP

(57) ABSTRACT

Techniques are provided for providing 3D audio, which may be used in augmented reality. A 3D audio signal may be generated based on sensor data collected from the actual room in which the listener is located and the actual position of the listener in the room. The 3D audio signal may include a number of components that are determined based on the collected sensor data and the listener's location. For example, a number of (virtual) sound paths between a virtual sound source and the listener may be determined. The sensor data may be used to estimate materials in the room, such that the affect that those materials would have on sound as it travels along the paths can be determined. In some embodiments, sensor data may be used to collect physical characteristics of the listener such that a suitable HRTF may be determined from a library of HRTFs.

17 Claims, 11 Drawing Sheets

(56) References Cited

OTHER PUBLICATIONS

Allen, J., and David A. Berkley. "Image Method for Efficiently Simulating Small-Room Acoustics," Journal of the Acoustical Society of America, Apr. 1979, pp. 943-950, vol. 65, issue 4. Acoustical Society of America, Melville, NY, USA.

Dellepiane, et al. "Reconstructing head models from photographs for individualized 3D-audio processing." Proceedings of the 16th Conference on Computer Graphics and Applications (Pacific Graphics), Oct. 8-10, 2008, pp. 1-9, vol. 27, No. 7, Tokyo, Japan.

Hugeng, Wahidin Wahab, and Dadang Gunawan. "Improved Method for Individualization of Head-Related Transfer Functions on Horizontal Plane Using Reduced Number of Anthropometric Measurements." Journal of Telecommunications, May 2010, pp. 1-11, vol. 2, issue 2.

Hurley, D.J., B. Arbab-Zavar and M.S. Nixon. "The Ear as a Biometric." Handbook of Biometrics, Oct. 29, 2007, pp. 131-150, Springer, New York, NY, USA.

Mohan, et al. "Using Computer Vision to Generate Customized Spatial Audio." Proceedings of the 2003 International Conference on Multimedia and Expo, Jul. 6-9, 2003, pp. 57-60, vol. 3, IEEE Computer Society, Baltimore, MD, USA.

O'Donovan, Adam, Ramani Duraiswami and Dmitry Zotkin. "Imaging Concert Hall Acoustics Using Visual and Audio Cameras." Proceedings of the Institute of Electrical and Electronics Engineers International Conference on Acoustics, Speech and Signal Processing, Mar. 31-Apr. 4, 2008, pp. 5284-5287, IEEE, Las Vegas, NV, USA.

Pec, Michal, Michal Bujacz, and Pawel Strumillo. "Personalized Head Related Transfer Function Measurement and Verification Through Sound Localization Resolution." Proceedings of the 15th European Signal Processing Conference, Sep. 3-7, 2007, pp. 1-5, European Association for Signal Processing (EUSASIP), Poznan, Poland.

Zotkin et al. "HRTF Personalization Using Anthropometric Measurements." Applied Acoustics, Feb. 2008, pp. 163-172, vol. 69, issue 2. Elsevier, Amsterdam, The Netherlands.

Zotkin et al., "Rendering Localized Spatial Audio in a Virtual Auditory Space." Institute of Electrical and Electronics Engineers Transactions on Multimedia, Aug. 2004, pp. 553-564, vol. 6, issue 4, IEEE Signal Processing Society, Piscataway, NJ, USA.

Chinese Office Action dated Oct. 23, 2013, Chinese Patent Application No. 201110321276.6, filed Oct. 12, 2011, 6 pages.

Partial English Translation of Chinese Office Action dated Oct. 23, 2013, Chinese Patent Application No. 201110321276.6, filed Oct. 12, 2011, 5 pages.

* cited by examiner

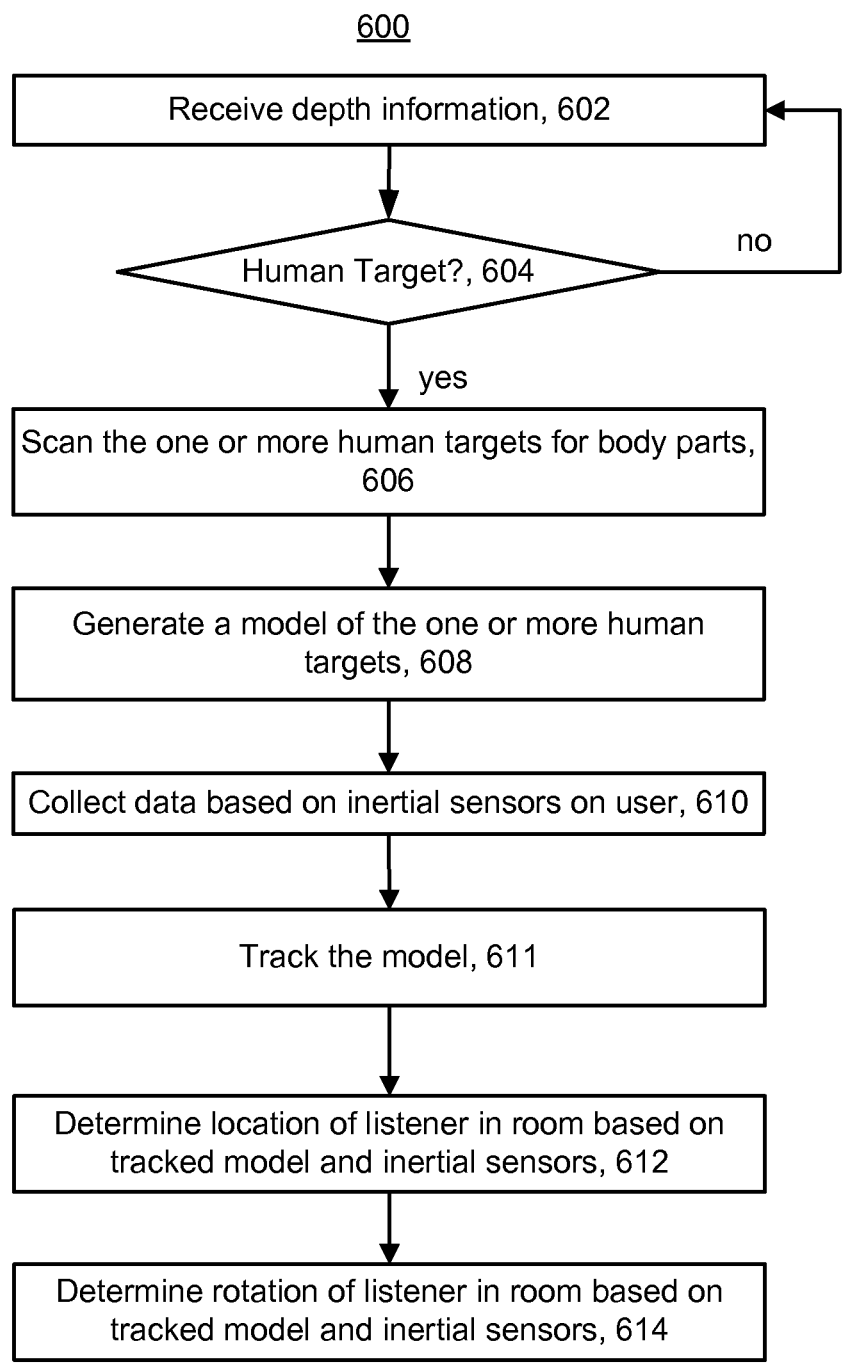

SYSTEM AND METHOD FOR HIGH-PRECISION 3-DIMENSIONAL AUDIO FOR AUGMENTED REALITY

BACKGROUND

It is well known that humans have the ability to recognize the source of a sound using their ears even without any visual cues. Humans estimate the location of a source by taking cues derived from one ear, and by comparing cues received at both ears (difference cues or binaural cues). Among the difference cues are time differences of arrival and intensity differences. The monaural cues come from the interaction between the sound source and the human anatomy, in which the original source sound is modified before it enters the ear canal for processing by the auditory system.

In a real-world situation the sound actually emanates from a particular location. It can be desirable to enable the listener to perceive that sound produced by audio-speakers appears to come from a particular location in 3-dimensional space. One possible technique involves having the user wear "headphones," also referred to as a "headset." That is, one audio-speaker is placed over or near each ear. This technique may employ creating an audio signal using a "head-related transfer function" (HRTF) to create the illusion that sound is originating from a location in 3D space. Herein, an audio signal that creates the illusion that sound is coming from a location in 3D space is referred to as a 3D audio signal.

An HRTF may be defined based on the difference between a sound in free air and the sound as it arrives at the eardrum. The HRTF describes how a given sound wave input (parameterized as frequency and source location) is filtered by the diffraction and reflection properties of the head and pinna, before the sound reaches the eardrum and inner ear. An HRTF may be closely related to the shape of a person's head and physical characteristics of their ears. Therefore, the HRTF can vary significantly from one human to the next. Thus, while HRTF's may be used to help create a 3D audio signal, challenges remain in tailoring the HRTF to each user.

One possible use of 3D audio is in augmented reality scenarios. Augmented reality may be defined as using some computer generated technique to augment a real world situation. Augmented reality, as well as other 3D applications, requires accurate 3-D audio. For example, a user should be able to accurately localize a sound as coming from a virtual sound source.

While techniques for 3D audio may exist, improvements are desired. As already noted, one improvement is to provide an accurate HRTF for the user. However, other improvements are also desired. A 3D audio signal should be accurate, consumer friendly, cost effective, and compatible with existing audio systems.

SUMMARY

Techniques are provided for providing 3D audio. The 3D audio may be used in augmented reality, but that is not required. Techniques disclosed herein are accurate, cost effective, user friendly, and compatible with existing audio systems. Techniques may use one or more sensors to collect real world data describing the environment (e.g., room) that a listener is in, as well as the listener's location in the room. A realistic 3D audio signal may be generated based on the data collected from the sensors. One option is to use sensors to collect data that describes physical characteristics of the listener (e.g., head and pinna shape and size) in order to determine a suitable HRTF for that listener.

One embodiment includes a method comprising determining physical characteristics of a room based on sensor data, determining a location of a listener in the room, and determining a 3D audio signal based on the physical characteristics of the room and the location of the listener in the room.

One embodiment includes an apparatus comprising one or more sensors, a processor, and a computer readable storage medium. The computer readable storage medium has instructions stored thereon which, when executed on the processor, cause the processor to collect data pertaining to an environment and a listener using the sensors. The processor determines physical characteristics of the environment and a location of a listener in the environment based on the sensor data. The processor determines different components of a 3D audio signal based on the physical characteristics of the environment and the location of the listener in the environment. The processor applies a head related transfer function (HRTF) for the listener to each of the components of the 3D audio signal, and provides the 3D audio signal.

One embodiment includes a method for providing a 3D audio signal. The method may include collecting sensor data that may include depth information. Physical parameters of a listener are determined based on the depth information. A head related transfer function (HRTF) may be determined based on a library of HRTFs—this determining may be on the physical parameters of the listener. Sensor data that includes depth information pertaining to a room may be collected. Physical parameters of the room may be determined based on that depth information. A location of the listener may be determined in the room. Sound paths between a virtual sound source and the listener may be determined based on the physical parameters of the room and the location of the listener in the room. Based on the physical parameters of the room, a component of a 3D audio signal may be determined for each of the sound paths. The HRTF for the listener may be applied to each of the components of the 3D audio signal, and the 3D audio signal may be provided.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

FIG. 6 depicts a flow diagram of a process of determining a listeners' location and rotation in the room.

DETAILED DESCRIPTION

Techniques are provided for providing 3D audio. The 3D audio may be used to augment reality, but other uses are possible. Techniques disclosed herein are accurate, cost effective, user friendly, and compatible with existing audio systems. A 3D audio signal may be generated based on sensor data collected from the actual room in which the listener is located and the actual position of the listener in the room. The audio signal may represent a "virtual sound" that represents a sound coming from some specific location in 3D space. This location might represent some object being displayed on a video screen, or even a real physical object in the listener's room. In some embodiments, the 3D audio signal is provided to the listener through a set of headphones. The 3D audio signal may include a number of components that are determined based on the collected sensor data and the listener's location. For example, locations of walls and furniture may be determined from the sensor data. A number of (virtual) sound paths between a virtual sound source and the listener may also be determined. The sensor data may be used to estimate materials in the room, such that the effect that those materials would have on sound as it travels along the paths can be determined. In some embodiments, sensor data may be analyzed to determine physical characteristics of the listener such that a suitable HRTF may be determined from a library of HRTFs. The HRTF for the listener may be applied to the different components of the 3D audio signal. Other details are discussed below.

Figure 1:
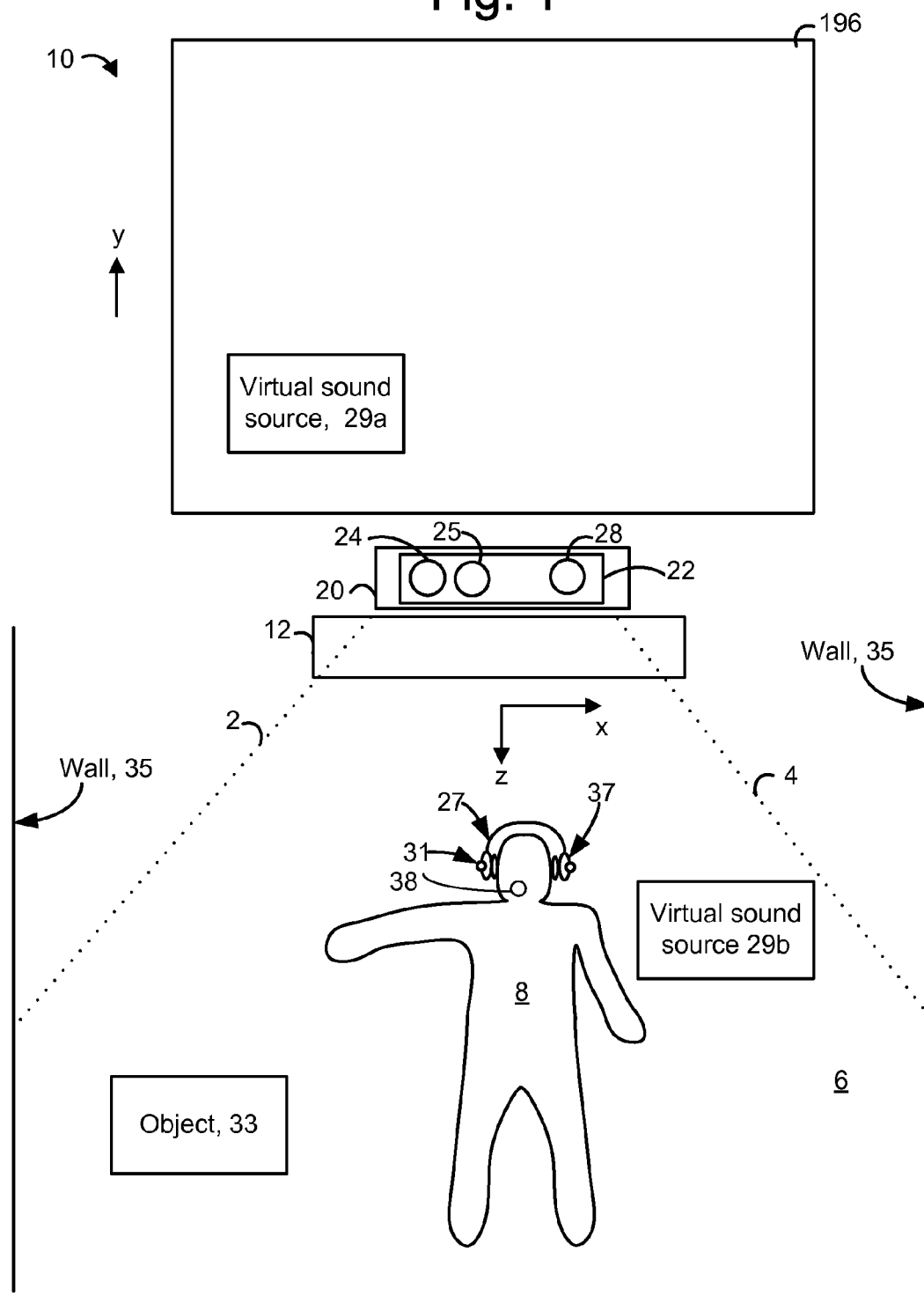
FIG. 1 depicts an example embodiment of a motion capture system.

In some embodiments, generating a 3D audio signal is used in a motion capture system. Therefore, an example motion capture system will be described. However, it will be understood that technology described herein is not limited to a motion capture system. FIG. 1 depicts an example of a motion capture and 3D audio system 10 in which a person in a room (or other environment) interacts with an application. The motion capture and 3D audio system 10 includes a display 196, a depth camera system 20, and a computing environment or apparatus 12. The depth camera system 20 may include an image camera component 22 having a light transmitter 24, light sensor 25, and a red-green-blue (RGB) camera 28. In one embodiment, the light transmitter 24 emits a collimated light beam. Examples of collimated light include, but are not limited to, Infrared (IR) and laser. In one embodiment, the light transmitter 24 is an LED. Light that reflects off from the listener 8, objects 33, walls 35, etc. in the field of view 6 is detected by the light sensor 25. In some embodiments, the system 10 uses this information to determine how to generate a 3D audio signal. Other information describing the room, such as RGB information (discussed below) may be used to determine how to generate the 3D audio signal.

A user, also referred to as a listener, stands in a field of view 6 of the depth camera system 20. The listener 8 is wearing headphones 27 through which the 3D audio sound may be provided. In this example, the headphones 27 include two audio speakers 37, one of which is worn over or next to each ear. The system 10 may provide the 3D audio signal, which drives the audio speakers 37. The 3D audio signal may be provided using a wireless or wireline connection. In some embodiment, the system 10 provides the 3D audio signal to another component, such as a high fidelity stereo system, HDTV, etc.

To the listener 8, the sound in the 3D audio signal may appear to be originating from some virtual sound source 29. As one example, the virtual sound source 29a could be an object being displayed on the display 196. However, the virtual sound source 29a could correspond to some real object 29b in the room. For example, the user might be instructed to place a gnome on a desk in front of them, wherein the system 10 may make it seem to the user that the gnome is talking to them (as a result of the 3D audio played through the headphones 27). The virtual sound source 29 might even seem to originate from outside of the room.

In some embodiments, the user "wears" one or more microphones 31, which may be used by the system 10 to determine acoustic properties of the room to provide a more realistic 3D audio signal. In this example, the microphones 31 are located on the headphones 27, but the user could "wear" the microphones 31 in another location. In some embodiments, the user "wears" one or more inertial sensors 38, which may be used by the system 10 to determine location and rotation of the listener 8. In this example, the inertial sensor 38 is located on the user's head but the user could "wear" the inertial sensor 38 in another location. For example, the inertial sensor 38 could be integrated into the headphones 27. In some embodiments, the user 8 may carry a camera, which may be used to provide the system 10 with depth and/or RGB information similar to that generated by the depth camera system 20.

Lines 2 and 4 denote a boundary of the field of view 6. A Cartesian world coordinate system may be defined which includes a z-axis which extends along the focal length of the depth camera system 20, e.g., horizontally, a y-axis which extends vertically, and an x-axis which extends laterally and horizontally. Note that the perspective of the drawing is modified as a simplification, as the display 196 extends vertically in the y-axis direction and the z-axis extends out from the depth camera system 20, perpendicular to the y-axis and the x-axis, and parallel to a ground surface on which the user stands.

Generally, the motion capture system 10 is used to recognize, analyze, and/or track an object. The computing environment 12 can include a computer, a gaming system or console, or the like, as well as hardware components and/or software components to execute applications.

The depth camera system 20 may include a camera which is used to visually monitor one or more objects 8, such as the user, such that gestures and/or movements performed by the user may be captured, analyzed, and tracked to perform one or more controls or actions within an application, such as selecting a menu item in a user interface (UI).

The motion capture system 10 may be connected to an audiovisual device such as the display 196, e.g., a television, a monitor, a high-definition television (HDTV), or the like, or even a projection on a wall or other surface, that provides a visual and audio output to the user. An audio output can also be provided via a separate device. Note that the 3D audio signal is typically provided through the headphones 27. To drive the display, the computing environment 12 may include a video adapter such as a graphics card and/or an audio adapter such as a sound card that provides audiovisual signals associated with an application. The display 196 may be connected to the computing environment 12 via, for example, an S-Video cable, a coaxial cable, an HDMI cable, a DVI cable, a VGA cable, or the like.

Figure 2:
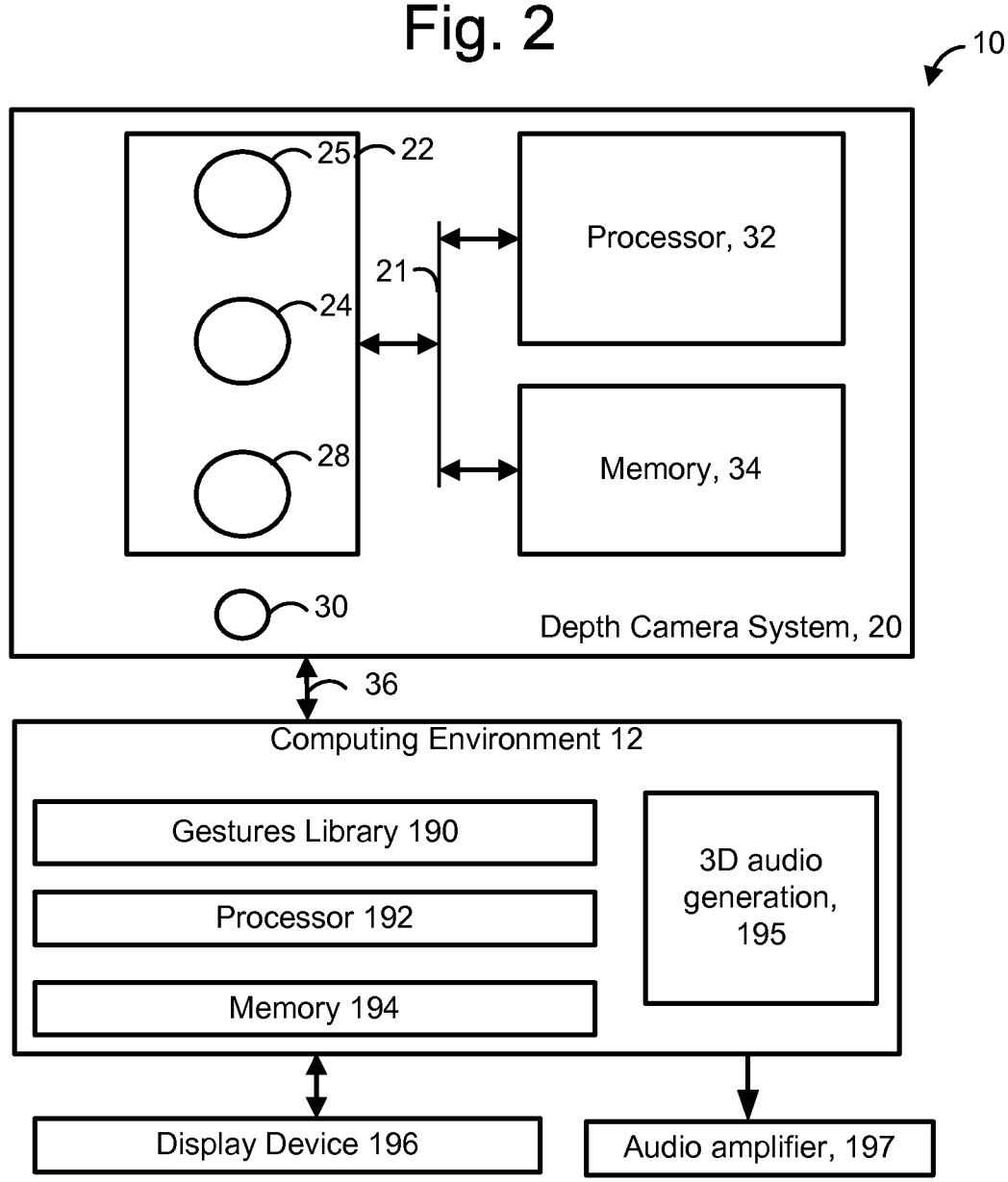
FIG. 2 depicts an example block diagram of the motion capture system of FIG. 1.

FIG. 2 depicts an example block diagram of the motion capture and 3D audio system 10 of FIG. 1. The system 10 includes a depth camera system 20 and a computing environment 12. In this embodiment, the computing environment 12 has 3D audio generation 195. The computing environment 12 inputs depth information and RGB information from the depth camera system 20 and outputs a 3D audio signal to the audio amplifier 197. The audio amplifier 197 might be part of a separate device such as an HDTV, stereo system, etc. The 3D audio generation 195 may be implemented by executing instructions on the processor 192. Note that hardware executed implementations, as well as mixed software/hardware implementations, are also possible.

The depth camera system 20 may be configured to generate a depth image that may include depth values. The depth camera system 20 may organize the depth image into "Z layers," or layers that may be perpendicular to a Z-axis extending from the depth camera system 20 along its line of sight. The depth image may include a two-dimensional (2-D) pixel area of the captured scene, where each pixel in the 2-D pixel area has an associated depth value which represents either a linear distance from the image camera component 22 (radial distance) or the Z component of the 3D location viewed by the pixel (perpendicular distance).

The image camera component 22 may include a light transmitter 24 and one or more light sensors 25 to capture intensity of light that reflect off from objects in the field of view. For example, depth camera system 20 may use the light transmitter 24 to emit light onto the physical space and use light sensor 25 to detect the reflected light from the surface of one or more objects in the physical space. In some embodiments, depth values are determined based on the intensity of light. For example, over time more and more photons reach a given pixel. After a collection period, the intensity of light at each pixel is sampled. The depth values in the depth image may be determined based on the intensity of light at each pixel. In some embodiments, the light transmitter 24 transmits pulsed infrared light. In some embodiments, the light is modulated at desired frequency.

The red-green-blue (RGB) camera 28 may be used to capture a visible light image. The depth camera system 20 may further include a microphone 30 which includes, e.g., a transducer or sensor that receives and converts sound waves into an electrical signal. Additionally, the microphone 30 may be used to receive audio signals such as sounds that are provided by a person to control an application that is run by the computing environment 12. The audio signals can include vocal sounds of the person such as spoken words, whistling, shouts and other utterances as well as non-vocal sounds such as clapping hands or stomping feet. In some embodiments, the microphone 30 is a microphone array, which may have any number of microphones running together. As noted in FIG. 1, there may also be one or more microphones 31 worn by the user 8. The output of those microphones 31 may be provided to computing environment 12 for use by 3D audio generation 195. If desired, the output of microphone 30 could also be used by 3D audio generation 195.

The depth camera system 20 may include a processor 32 that is in communication with the image camera component 22. The processor 32 may include a standardized processor, a specialized processor, a microprocessor, or the like that may execute instructions including, for example, instructions for generating a 3D audio signal.

The depth camera system 20 may further include a memory component 34 that may store instructions that are executed by the processor 32, as well as storing images or frames of images captured by the RGB camera, or any other suitable information, images, or the like. According to an example embodiment, the memory component 34 may include random access memory (RAM), read only memory (ROM), cache, flash memory, a hard disk, or any other suitable tangible computer readable storage component. The memory component 34 may be a separate component in communication with the image capture component 22 and the processor 32 via a bus 21. According to another embodiment, the memory component 34 may be integrated into the processor 32 and/or the image capture component 22.

The depth camera system 20 may be in communication with the computing environment 12 via a communication link 36. The communication link 36 may be a wired and/or a wireless connection. According to one embodiment, the computing environment 12 may provide a clock signal to the depth camera system 20 via the communication link 36 that indicates when to capture image data from the physical space which is in the field of view of the depth camera system 20.

Additionally, the depth camera system 20 may provide the depth information and images captured by the RGB camera 28 to the computing environment 12 via the communication link 36. The computing environment 12 may then use the depth information, and captured images to control an application. For example, as shown in FIG. 2, the computing environment 12 may include a gestures library 190, such as a collection of gesture filters, each having information concerning a gesture that may be performed (as the user moves). For example, a gesture filter can be provided for various hand gestures, such as swiping or flinging of the hands. By comparing a detected motion to each filter, a specified gesture or movement which is performed by a person can be identified. An extent to which the movement is performed can also be determined.

The computing environment may also include a processor 192 for executing instructions which are stored in a memory 194 to provide audio-video output signals to the display device 196 and to achieve other functionality.

Figure 3:
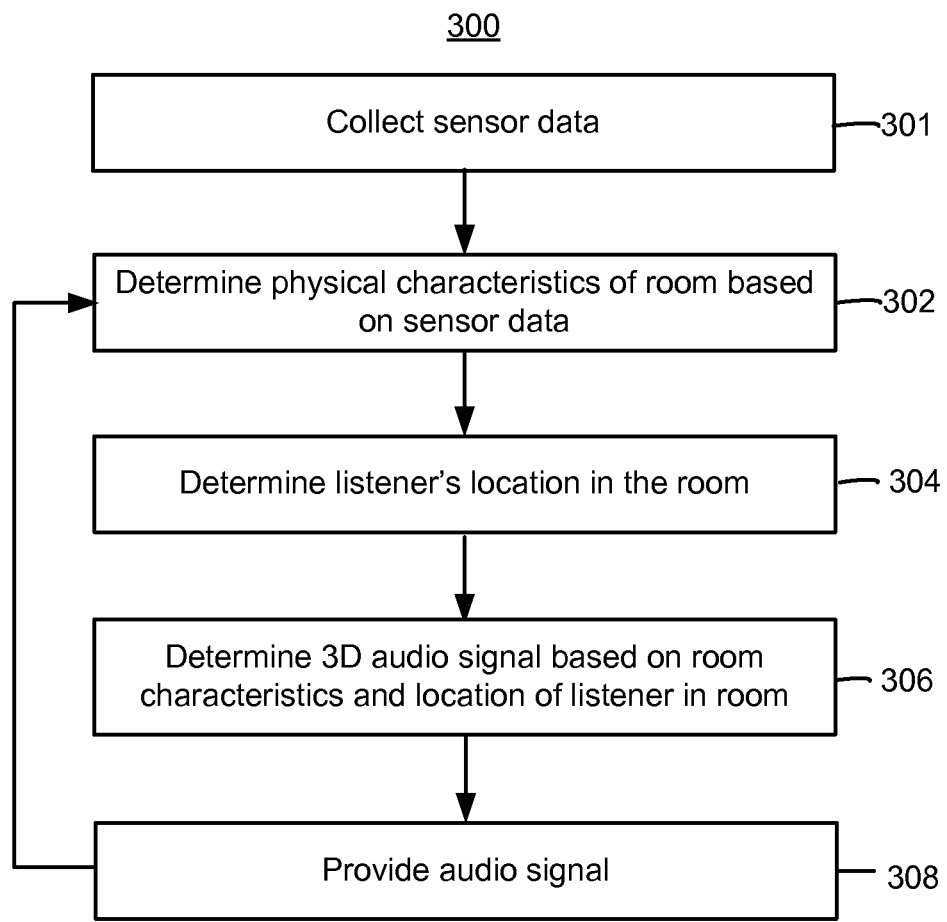
FIG. 3 is a flowchart of one embodiment of a process of providing a 3D audio signal.

FIG. 3 is a flowchart of one embodiment of a process 300 of providing a 3D audio signal. Process 300 may be implemented within system 10, but a different system could be used. In step 301, sensor data is collected. The sensor data could include, but is not limited to, depth information, RGB data, and audio data. For example, the depth camera system 20 could be used to collect light that it transmitted (using light transmitter 24) with light sensor 25. The RGB camera 28 could also be used. In one embodiment, one or more microphones 31 worn by the user 8 are used to collect sensor data. The microphone 30 in the depth camera system 20 might also be used. In one embodiment, the user 8 holds a camera and moves it around to collect sensor data about the room. This data could include depth information and RGB data.

In step 302, physical characteristics of the room or other environment in which the listener is present are determined based on the sensor data. The sensor data can be used to determine information such as where the walls and various objects are located. Also, the sensor data might be used to estimate materials in the room. For example, the sensor data might be used to determine whether the floor is hardwood or carpeted.

In step 304, the listener's location in the room is determined. In one embodiment, the listener's location is determined using sensor data. For example, the sensor data collected in step 302 might be used to determine the listener's location.

In step 306, a 3D audio signal is determined based on the listener's location in the room and one or more of the physical characteristics of the room. As one example, a number of sound paths between a virtual sound source and the listener can be determined. Furthermore, the physical characteristics of the room can be factored in. As one example, a sound reflecting off from a hardwood floor will be different than a sound reflecting from a carpet. Therefore, this may be factored in for a sound path having such a path. In some embodiments, an HRTF for the listener is applied to form the 3D audio signal. In some embodiments, the HRTF for the listener is determined based on sensor determined characteristics. For example, the sensors in the image camera component 20 may capture depth and/or RGB data. There may be a library of HRTFs from which a suitable one is selected (or otherwise determined) based on a matching process.

In step 308, the 3D audio signal is provided. For example, the 3D audio signal is provided to an audio amplifier 197, which is used to drive the headphones 27. Note that process 300 may repeat by collecting more sensor data (step 301), re-determine physical characteristics of room (step 302), re-determining the listener's location (step 304), etc. However, it is not required that all steps be repeated continuously. For example, process 300 might re-determine the room characteristics at any desired interval. Certain information might be expected to remain the same (e.g., locations of walls). However, other room information, such as locations of objects might change over time. Since the listener's location might change quite frequently, it might be carefully tracked.

Figure 4A:
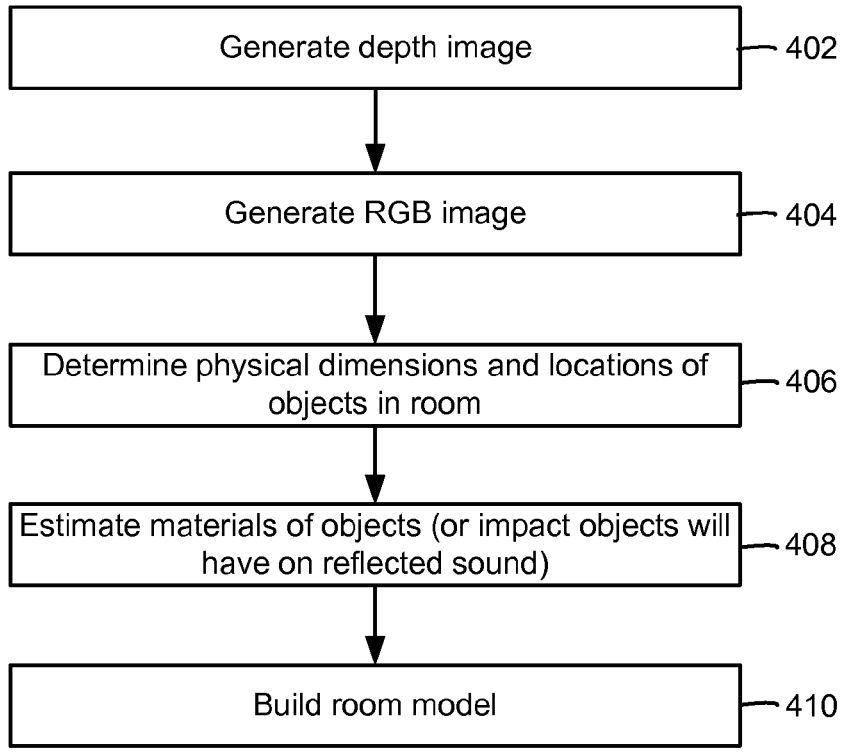
FIG. 4A depicts a flow diagram of a process of determining a model of a room.

FIG. 4A depicts a flow diagram of one embodiment of a process 400 of determining a model of the room. Process 400 may be used in steps, 301 302 and 306 of process 300. For example, the model may be built from sensor data collected in step 301 and used to determine the audio components in step 306. In step 402, a depth image of one or more objects in the room is generated. In one embodiment, the depth image is formed by the depth camera system 20 transmitting an IR beam into a field of view and collecting the reflected data at one or more image sensors. Then, the sensor data is processed to determine depth values (e.g., distances to various objects). Note that since the field of view may be limited, the depth camera system 20 may adjust the field of view and repeat to collect additional depth information. In some embodiments, the image camera component 22 is controlled by a motor that allows the field of view to be moved to capture a fuller picture of the room. As noted above, the user 8 may hold a camera and use it to scan the room to collect depth data.

In step 404, an RGB image of one or more objects in the room is generated. In one embodiment, the RGB image is formed by the depth camera system 20 using the red-green-blue (RGB) camera 28. As noted above, the user 8 may hold a camera and use it to scan the room to collect RGB data. As with the depth image, the RGB image may be formed from more than one data collection step. Steps 402 and 404 are one embodiment of step 301.

In step 406, physical dimensions of the room and objects in the room are determined. The physical location of objects may also be determined. This information may be based on the data collected in steps 402 and 404. In some embodiments, the physical dimensions are extrapolated based on the collected data. As noted, the depth camera system 20 might not collect data for the entire room. For example, referring to FIG. 1, the field of view might not capture the entire walls 35. In such a case, one option is to extrapolate the collected data to estimate a location of the wall 35 for regions in which there is no data. Step 406 is one embodiment of step 302.

In step 408, an estimate is made of materials of the objects in the room. As one example, an estimate is made of the material of various pieces of furniture, the walls, ceiling, floors, etc. In some embodiments, the depth information is used to assist in this determination. For example, the depth information might be used to determine whether a floor is smooth (and possibly hardwood or tiled) or rough (possibly carpeted). The RGB information may also be used. Note that it is not required that the actual material be estimated, although that is one option. A reason for estimating the material is to be able to determine how the material will affect sound. Therefore, any parameter that can be used to determine how the material will affect reflection of sound off from the object can be determined and stored.

In step 410, a model of the room is constructed based on the physical dimensions and materials determined in step 406 and 408. Later, a 3D audio signal may be generated based on this room model. For example, the model may be used in step 306 of process 300. Therefore, the actual reality of the user's room may be augmented with the 3D audio signal. Steps 406, 408, and 410 are one embodiment of step 302.

Figure 4B:
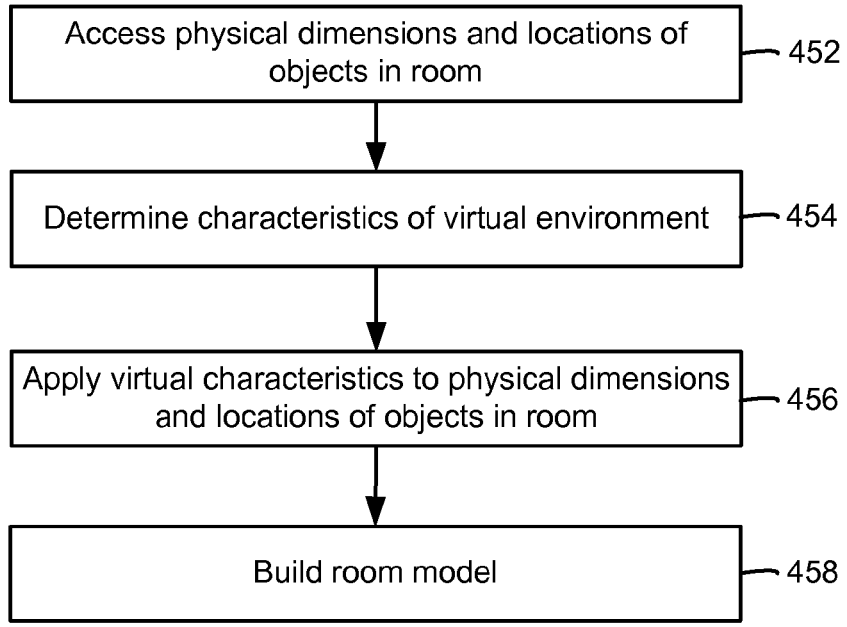
FIG. 4B depicts a flowchart of one embodiment of a process of building a room model based on virtual characteristics and real characteristics.

FIG. 4B depicts one embodiment of a process 450 of building a room model based on virtual characteristics and real characteristics. As one example, the process 450 might be used to make it seem to the listener that their room is transformed in some way. For example, if the user is playing a video game in which the user is imagining that they are in a prison cell, then the process 450 can be used to build a room model with characteristics of a prison cell. This model may use some of the actual characteristic of the user's room, such as size and location of objects. However, instead of using actual materials of the real objects, virtual characteristics may be used. For example, instead of an actual thick carpet, a cement floor could be modeled. Thus, the reality of the listener's room may be augmented by a 3D audio signal based on this model.

In step 452, physical dimensions and locations of objects in the actual room are accessed. These characteristics may have already been determined using process 400. However, the actual room characteristics could be re-determined, if desired.

In step 454, characteristics of a virtual environment are determined. For example, a software application that implements a virtual game may provide parameters that define the virtual environment. In the present example, the application may provide parameters describing virtual materials for walls, floors, ceilings, etc. Note that the parameters could be determined in another manner.

In step 456, the virtual characteristics are applied to the actual room characteristics. Thus, instead of determining that the user's actual floor is carpeted and determining how sound will be affected by carpeting, the user's floor is modeled as being cement. Then, a determination may be made how cement will affect sound reflections. If desired, various objects in the room could have virtual characteristics applied to them. For example, a sofa could have the characteristics of stone applied to it if it is desired to have the sofa simulate a bolder.

In step 458, a model of the user's room is constructed based on the information from step 456. This model may be used when generating a 3D audio signal. For example, this model could be used in step 306 of process 300 of FIG. 3. Note that actual objects in the user's room (furniture, walls, ceiling, etc.) may be used in determining the model. Therefore, the reality of the user's actual room may be augmented by the 3D audio signal.

Figure 5A:
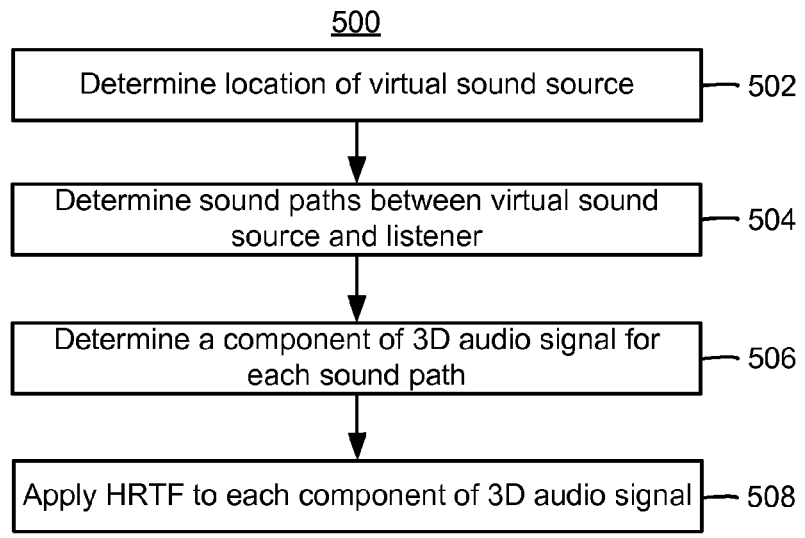
FIG. 5A is a flowchart of one embodiment of a process of determining audio components for a 3D audio signal.

FIG. 5A is a flowchart of one embodiment of a process 500 of determining components for a 3D audio signal. Process 500 is one embodiment of step 306 of process 300. In step 502, the location of a virtual sound source 29 is determined. For example, if a user is interacting with a virtual world depicted on a display 196, then the virtual sound source 29 could be some object being displayed in that virtual world. However, the virtual sound source 29 could be an actual or virtual object in the user's room. For example, the user could place an object at a desired location in the room. Then, the system could identify the location of the object. As specific example, the system could instruct the user to place an object where the user's wants it. In response, the user might place a gnome on a desk. The system then determines the location of the object by, for example, using the depth camera system. As discussed earlier, the system may track the physical location of the user. Therefore, the system is able to determine that the user has placed the gnome on the desk, by tracking the user's movements. Other techniques could be used for the system to determine the actual location of the virtual sound source 29. The virtual sound source 29 could even be outside of the room. For example, system could make it seem that someone is knocking on a door or talking from the other side of a door.

Figure 5B:
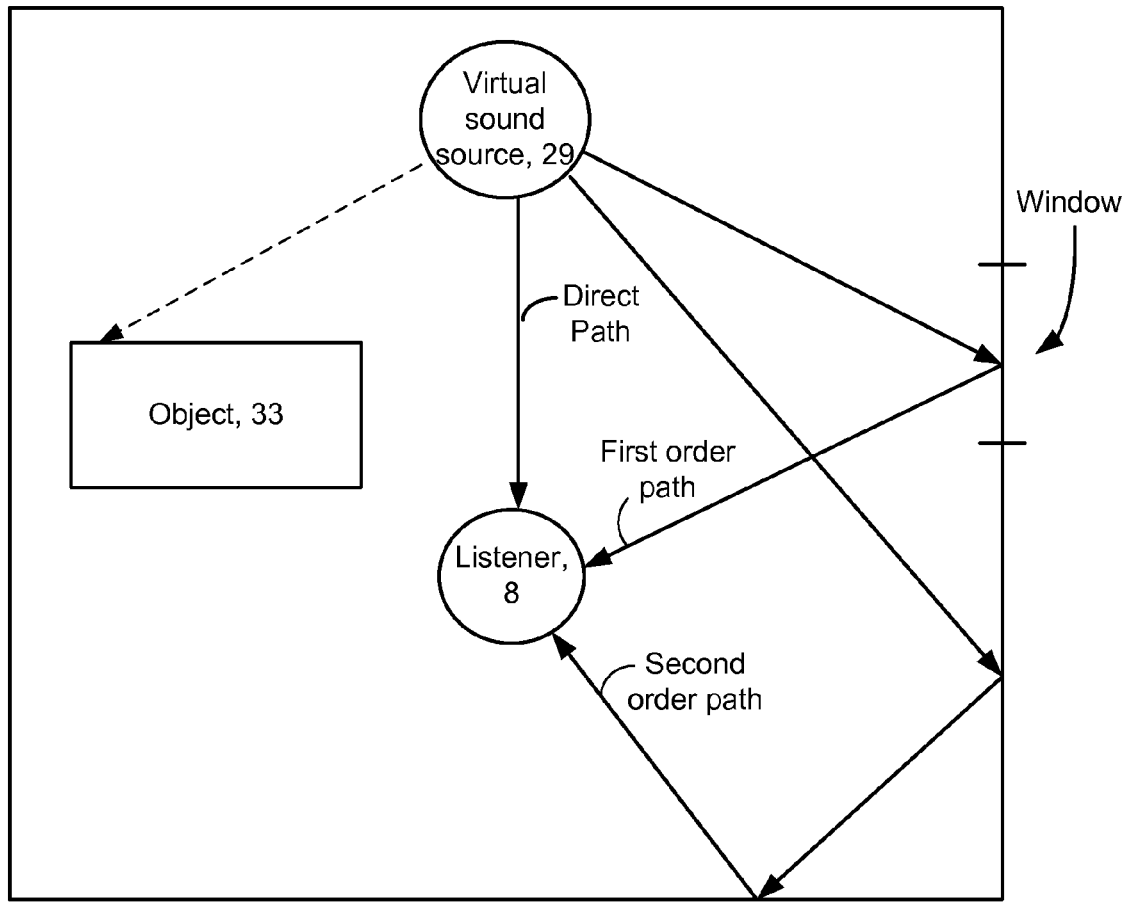
FIG. 5B depicts a top view of a room to illustrate possible sound paths in 2-dimensions.

In step 504, sound paths between the virtual sound source 29 and the listener 8 are determined. This may include determining a direct path and one or more indirect paths. Step 504 may be based on the room information that was determined in step 302 of process 300. FIG. 5B depicts a top view of a room to illustrate possible sound paths in 2-dimensions. Note that the system 10 may determine the sound paths in 3-dimensions; however 2-dimensions are used to simply explanation. Prior to step 504, the system may determine the location of the listener 8 and other objects 33 in the room. As one example, the other object 33 might be a sofa. The sound paths include a direct sound path and two indirect sound paths, in this example. One indirect sound path is a first order path that includes sound reflection from one object. A second order path that includes reflections from two objects is also depicted. In this example, object 33 blocks a potential first order path (indicated by dashed arrow to object 33). Paths of third order and higher may also be determined. Note that reflections off from objects other than walls may be considered. The particular view of FIG. 5B does not depict reflection of sound off from the floor and ceiling, but those sound paths may be considered also.

In step 506, a component of the 3D audio signal is determined for each sound path. These different components may be joined to form the 3D audio signal. The information about materials in the room may be used in step 506. For example, if it was determined that there is a closed window along the first order path, the effect of the sound reflecting off from glass may be factored in. On the other hand, it might be determined that the window is presently open, in which case that first order path might be removed from consideration. As another example, the blinds might be closed, in which case the effect that the blinds have on sound traveling on the first order path is considered. As noted earlier, the information about the room may be updated at any desired interval. Therefore, while the user is interacting, the 3D audio that is generated might change due to circumstances such as the user opening the window, closing the blinds, etc.

In step 508, an HRTF for the listener is applied to each audio component. Further details of determine a suitable HRTF for the listener are discussed below. After applying the HRTF to each audio component, the components may be put together to generate the 3D audio signal. Note that other processing may be performed prior to outputting the 3D audio signal.

FIG. 6 depicts a flow diagram of a process 600 of determining a listener's location and rotation in the room. For example, process 600 might be used to determine which way the user's head is rotated. Process 600 is one embodiment of step 304 of process 300. Note that process 600 does not necessarily include collecting information for determining a suitable HRTF for the listener 8. That information might be collected on a more limited basis, as described below. The example method may be implemented using, for example, the depth camera system 20. The user 8 may be scanned to generate a model such as a skeletal model, a mesh human model, or any other suitable representation of a person. The model may then be used with the room information to determine the user's location in the room. The user's rotation (e.g., which way the user's head is oriented) may also be determined from the model.

According to one embodiment, at step 602, depth information is received, e.g., from the depth camera system. The depth image may be down-sampled to a lower processing resolution so that it can be more easily used and processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information may such that the depth information may used to generate a model such as a skeletal model.

At decision step 604, a determination is made as to whether the depth image includes a human target. This can include flood filling a target or object in the depth image comparing the target or object to a pattern to determine whether the depth image includes a human target. For example, various depth values of pixels in a selected area or point of the depth image may be compared to determine edges that may define targets or objects as described above. The likely Z values of the Z layers may be flood filled based on the determined edges. For example, the pixels associated with the determined edges and the pixels of the area within the edges may be associated with each other to define a target or an object in the capture area that may be compared with a pattern, which will be described in more detail below.

If decision step 604 is true, step 606 is performed. If decision step 604 is false, additional depth information is received at step 602.

The pattern to which each target or object is compared may include one or more data structures having a set of variables that collectively define a typical body of a human. Information associated with the pixels of, for example, a human target and a non-human target in the field of view, may be compared with the variables to identify a human target. In one embodiment, each of the variables in the set may be weighted based on a body part. For example, various body parts such as a head and/or shoulders in the pattern may have weight value associated therewith that may be greater than other body parts such as a leg. According to one embodiment, the weight values may be used when comparing a target with the variables to determine whether and which of the targets may be human. For example, matches between the variables and the target that have larger weight values may yield a greater likelihood of the target being human than matches with smaller weight values.

Step 606 includes scanning the human target for body parts. The human target may be scanned to provide measurements such as length, width, or the like associated with one or more body parts of a person to provide an accurate model of the person. In an example embodiment, the human target may be isolated and a bitmask of the human target may be created to scan for one or more body parts. The bitmask may be created by, for example, flood filling the human target such that the human target may be separated from other targets or objects in the capture area elements. The bitmask may then be analyzed for one or more body parts to generate a model such as a skeletal model, a mesh human model, or the like of the human target.

Step 608 includes generating a model of the human target. In one embodiment, measurement values determined by the scanned bitmask may be used to define one or more joints in a skeletal model. The one or more joints are used to define one or more bones that correspond to a body part of a human. Generally, each body part may be characterized as a mathematical vector defining joints and bones of the skeletal model. Body parts can move relative to one another at the joints. The model may include information that describes the rotation of the user's head such that the orientation of the user's ears is known.

In step 610, inertial sensors on the user collect data. In one embodiment, at least one inertial sensor is located on the user's head to allow tracking of the user's head.

At step 611, the model is tracked by updating the person's location several times per second. As the user moves in the physical space, information from the depth camera system is used to adjust the skeletal model such that the skeletal model represents a person. The data from the inertial sensors may also be used to track the user. In particular, one or more forces may be applied to one or more force-receiving aspects of the skeletal model to adjust the skeletal model into a pose that more closely corresponds to the pose of the human target in physical space. Generally, any known technique for tracking movements of one or more persons can be used.

In step 612, the user's location in the room is determined based on tracking the model. In step 614, the rotation of the user's head is determined based on tracking the model. Process 600 may continue to track the user such that the location and rotation may be updated.

Figure 7:
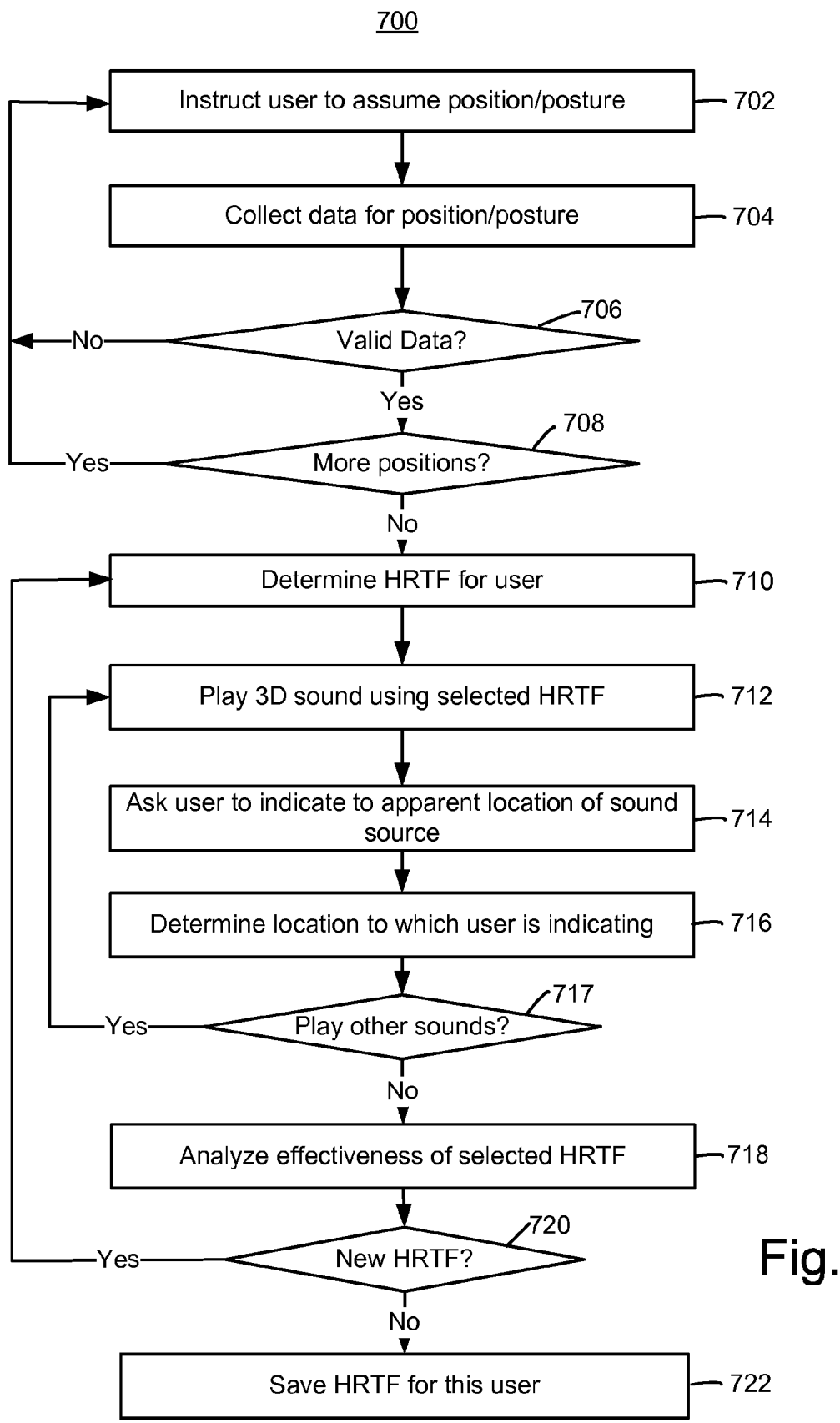
FIG. 7 depicts one embodiment of a process of determining an HRTF for a particular listener.

In some embodiments, the HRTF for the listener 8 is determined from a library of HRTFs based on physical characteristics of the listener 8. These physical characteristics may be determined based in input from sensors, such as depth information and RGB information. FIG. 7 depicts one embodiment of a process 700 of determining an HRTF for a particular listener 8. This HRTF may be used in step 306 of process 300 or step 508 of process 500. Note that the HRTF may be determined at any time. As one example, the HRTF is determined once for the user and stored for use again and again. Of course, it is possible to revise the HRTF (e.g., select new HRTF).

In step 702, the system 10 instructs the user 8 to assume a certain position or posture. For example, the system instructs the user to look to the left. In step 704, the system 10 collects data with the user in that position. For example, the depth camera system 20 is used to collect depth information (with sensor 25) and RGB information (with sensor 28). In step 706, the system determines whether the data is valid. For example, if the system was expecting data for a right ear, then the system determines whether the data matches what is expected for a right ear. If not, step 702 may be repeated such that the user is again instructed to assume the correct posture. If the data is valid (step 706 is yes), then the system determines whether there are more positions/postures for the user to assume. Over the next iterations the user might be asked to look straight ahead, look right, etc. Data could be collected for a wide variety of positions.

When suitable data is collected, the process 700 goes on to step 710 to determine a HRTF for the user 8 in step 710. In some embodiments, there is a library of HRTFs from which to select. These HRTFs may be associated to various physical characteristics of users. Examples include, but are not limited to, head size and width, pinna characteristics, body size. For example, a specific HRTF may be associated with specific measurements related to head size and pinna. The measurements might be a range or a single value. For example, one measurement might be head width, which could be expressed in terms of a single value or a range. The system may then select an HRTF for the user by matching the user's physical characteristics to the physical characteristics associated with the HRTFs in the library. Any technique may be used to determine a best match. In one embodiment, the system interpolates to determine the HRTF for the user. For example, the user's measurements may be between the measurements for two HRTFs, in which case the HRTF for the user may be determined by interpolating the parameters for the two HRTFs.

Next, the system may perform additional steps to verify that this HRTF determination is good, and perhaps select a better HRTF for this listener. In step 712, the system plays a 3D audio signal for the user. This may be played through a headset being worn by the user. The user may be asked to point to the apparent source of the 3D audio signal, in step 714. In one embodiment, the process is made into a game where the user is asked to shoot at the sound. For example, the system plays a duck sound without any visuals. In step 716, the system determines the location to which the user is pointing. Step 716 may include using the depth camera system to collect depth information. The system might also ask the user for voice input, which the system could recognize using speech recognition. Steps 712-716 may be repeated for other sounds, until it is determined in step 717 that sufficient data is collected.

In step 718, the system determines how effective the HRTF was. For example, the system determines how accurately the user was able to locate the virtual sounds. In one embodiment, if the user hit the source of the sound (e.g., the user shot the duck), then the system displays the duck on the display 196. The system then determines whether a different HRTF should be determined for this user. If so, the new HRTF is determined by returning to step 710. The process 700 may repeat steps 712-718 until a satisfactory HRTF is found.

In step 722, an HRTF is stored for the user. Note that this is not necessarily the last HRTF that was tested in process 700. That is, the system may determine that one of the HRTFs that were tested earlier in the process 700 might be the best. Also note that more than one HRTF could be stored for a given user. For example, process 700 could be repeated for the user wearing glasses and not wearing glasses, with one HRTF stored for each case.

Figure 8:
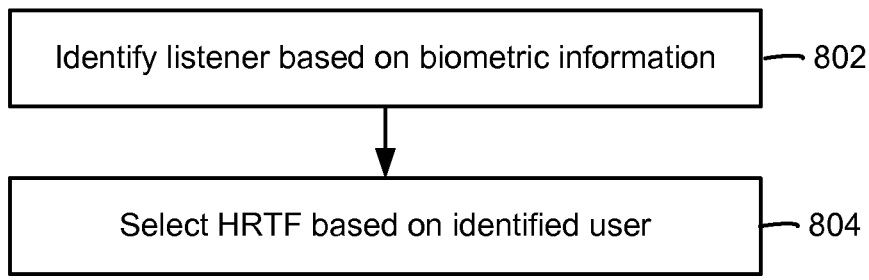
FIG. 8 depicts a flowchart of one embodiment of a process of selecting an HRTF for a listener based on detailed characteristics that were previously collected.

As noted, the process of determining detailed characteristics of the listener 8 such that an HRTF may be stored for the user might be done infrequently—perhaps only once. FIG. 8 depicts a flowchart of one embodiment of a process 800 of selecting an HRTF for a listener 8 based on detailed characteristics that were previously collected. For example, process 700 may be performed once prior to process 800. However, process 800 might be performed many times. In step 802, the listener 8 is identified using biometric information. Note that this information is not the same information collected during process 700. However, it is possible that there might be some overlap of information. Collecting biometric information may include collecting depth information and RGB information. In one embodiment, the system is able to recognize the listener based on, for example, facial recognition.

In step 804, a suitable HRTF is selected for the user identified in step 802. In one embodiment, an HRTF that was stored for the user in process 700 is selected. In another embodiment, the detailed user characteristics were stored in process 700. Then, in process 800 the HRTF may be selected based on the stored detailed user characteristics. If desired, these stored detailed user characteristics may be augmented by information that is presently collected. For example, the user might be wearing a hat at this time. Thus, the system might select a different HRTF than if the user did not wear a hat during process 700.

Figure 9:
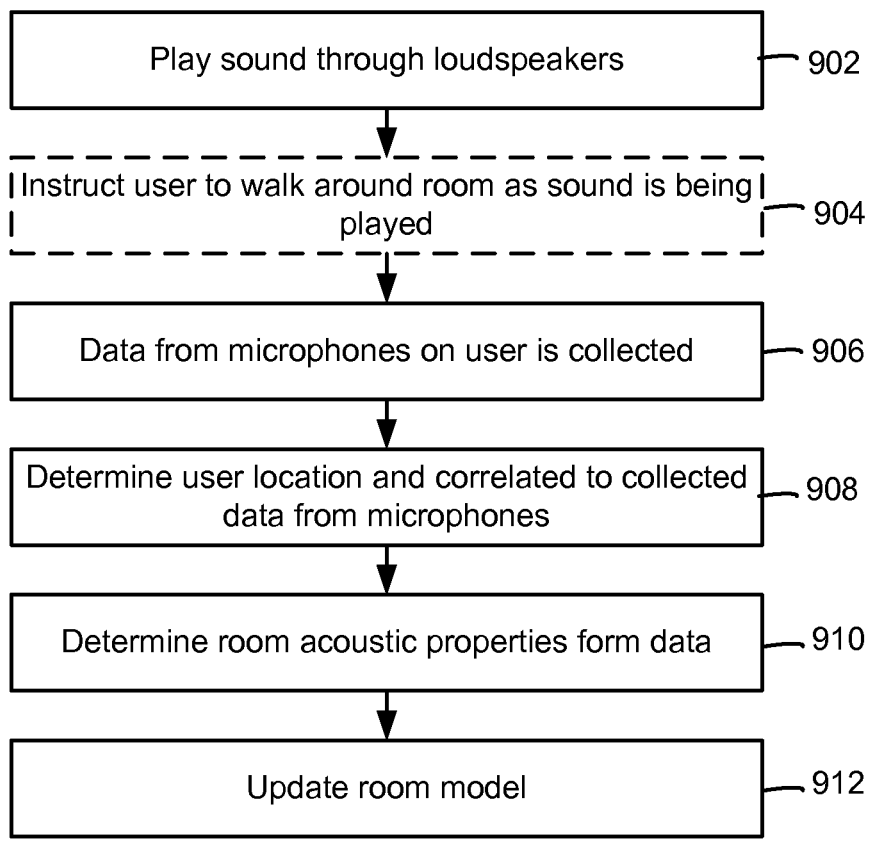
FIG. 9 is a flowchart depicting one embodiment of a process of modifying the room model based on such data.

As noted above, the user might wear one or more microphones that can collect acoustic data about the room. FIG. 9 is a flowchart depicting one embodiment of a process 900 of modifying the room model based on such data. As one example, process 400 might have been performed at least once to determine a room model based on a depth image and/or an RGB image. Then, process 900 may be used to modify that room model.

In step 902, sound is played through loudspeakers located in the room that the listener is in. This step may be performed at anytime to help refine the model of the room. In optional step 904, the user is instructed to walk around the room as the sound is being played. The user is not necessarily told specifically where to walk. On the other hand, the user might be instructed to walk around the room to different locations; however, this is not required. Note that step 904 is optional. In one embodiment, rather than instructing the user that they should move around the room, it is simply assumed that the user will move around as a part of normal game play or other interaction. In step 906, data from one or more microphones 31 worn by the user is collected while the sound is being played. The user could wear these microphones 31 near their ears, but that is not required. In step 908, the user's location is determined and correlated with the data collected from the microphones 31. One option is to use depth information and RGB information to locate the user. In step 910, room acoustical properties are determined based on the data collected in step 906, as correlated to the user's location in step 908. In step 912, the room model is updated based on the acoustic properties determined in step 910.

As noted, process 400 may be performed as often as desired. Therefore, one option is build the room model using process 400. Then, the room model may be updated using process 900. Next, the room model may be updated (or created anew) using process 400 again one or more times. Another option is to combine process 900 with process 400. For example, the initial room model that is generated may be based on use of both process 400 and 900.

Figure 10:
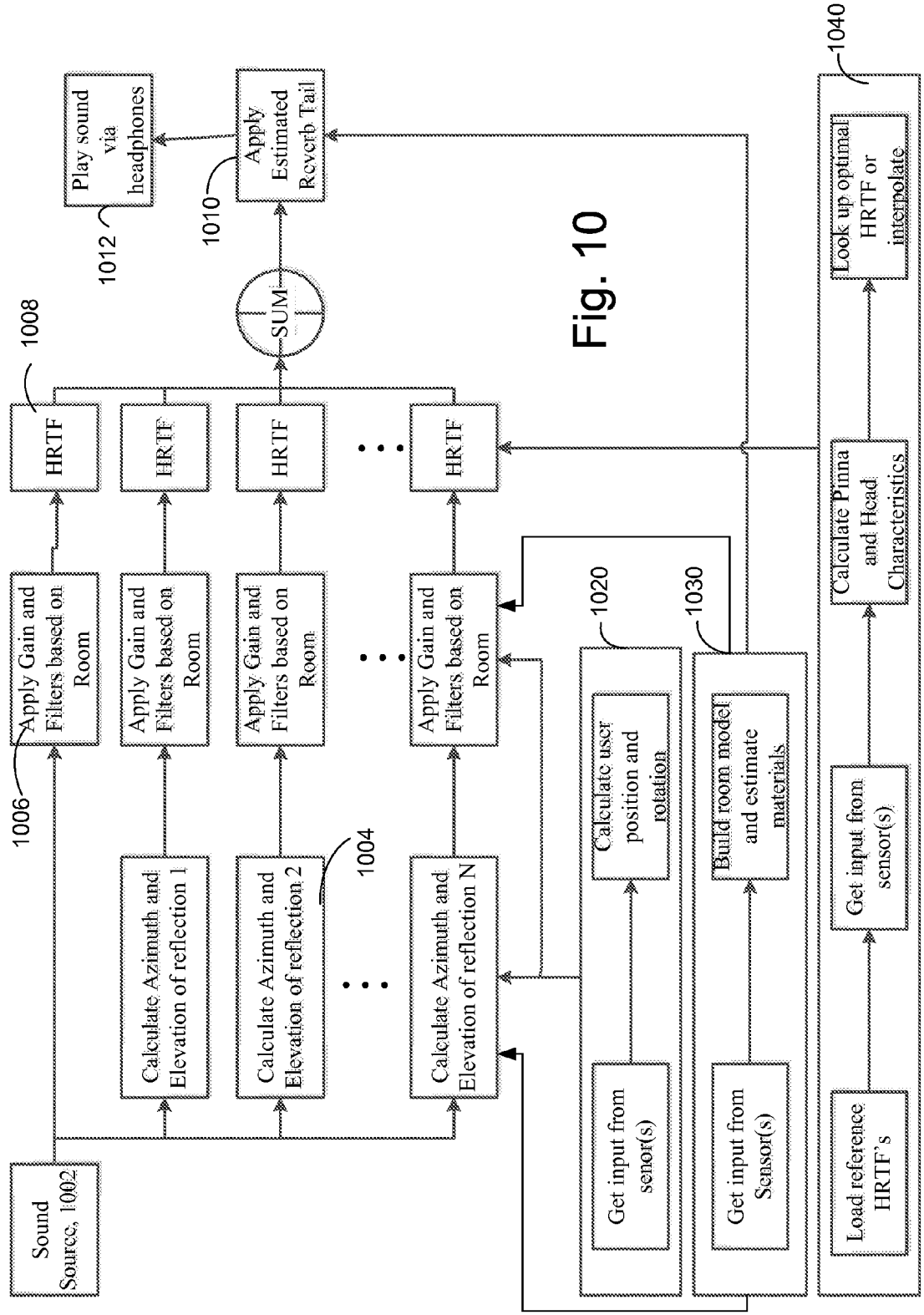
FIG. 10 depicts a block diagram of one embodiment of generating a 3D audio signal.

FIG. 10 depicts a block diagram of one embodiment of generating a 3D audio signal. The block diagram provides additional details for one embodiment of process 300. Sound source 1002 represents the virtual sound upon which the 3D audio signal is to be based. For example, the sound source might be digital data of a dog barking (recorded or computer generated). In general, the sound source 1002 is processed along several paths—a direct path and several reflective paths. One example of these paths was provided in FIG. 5B. For the direct path, the sound source 1002 is processed by applying gain and filters 1006; then an HRTF 1008 for the listener is applied. For the indirect paths, first an azimuth and elevation are calculated 1004 for each reflection path. Then, the processing is similar as described for the direct path. The results may be summed prior to applying estimated reverb tail 1010 to produce the final 3D audio signal, which may be played through headphones 1012.

The diagram of FIG. 10 depicts that sensor input may be used for various reasons. Sensor input may be used to calculate the user's position and rotation, as depicted in box 1020. Sensor input may be used to build a room model, as well as to estimate room materials, as depicted in box 1030. Finally, sensor input may be used to determine user characteristics, such as pinna and head characteristics, as depicted in box 1040. These user characteristics may be used to determine a HRTF for the user. Note that the HRTF for the user is not required to be one from the library. For example, interpolation could be used to form the HRTF from two or more HRTFs in the library.

The sensor input for box 1020 (used to calculate user position) may include, but is not limited to, depth information, RGB information, and inertial data (from inertial sensor on user). The sensor input for box 1030 (used to determine room model) may include, but is not limited to, depth information, RGB information, and acoustic data (e.g., from microphones worn by user). The sensor input for box 1040 (used to determine HRTF) may include, but is not limited to, depth information and RGB information.

In order to calculate the azimuth and elevation of the reflections, data from box 1020 and 1030 may be used. Similarity, the gain and filters may use the data from box 1020 and 1030. Note that the sensor data may be updated at any time. For example, the user might be moving such that the sensor data that captures user location changes quite frequently. These changes may be fed into, for example, the azimuth and elevation calculations 1004 such that the 3D audio signal is constantly being updated for the changing user position. Similarly, the change in user position may be fed, in real time, to the gain and filters 1006. In some embodiments, the HRTF for the user is not updated in real time. However, updating the HRTF for the user in real time is one option.

The reverb tail that is added near the end of generating the 3D audio signal may be based on the room model and estimate of the materials. Therefore, box 1030 may be an input to estimating the reverb tail 1010. In one embodiment, the system stores a library of reverb tails that are correlated to factors such as room sizes and materials. The system is able to select one of the reverb tails based on the room model. The system may also interpolate between two stored reverb tails. Thus, by selecting a stored reverb tail, computation time is saved.

Figure 11:
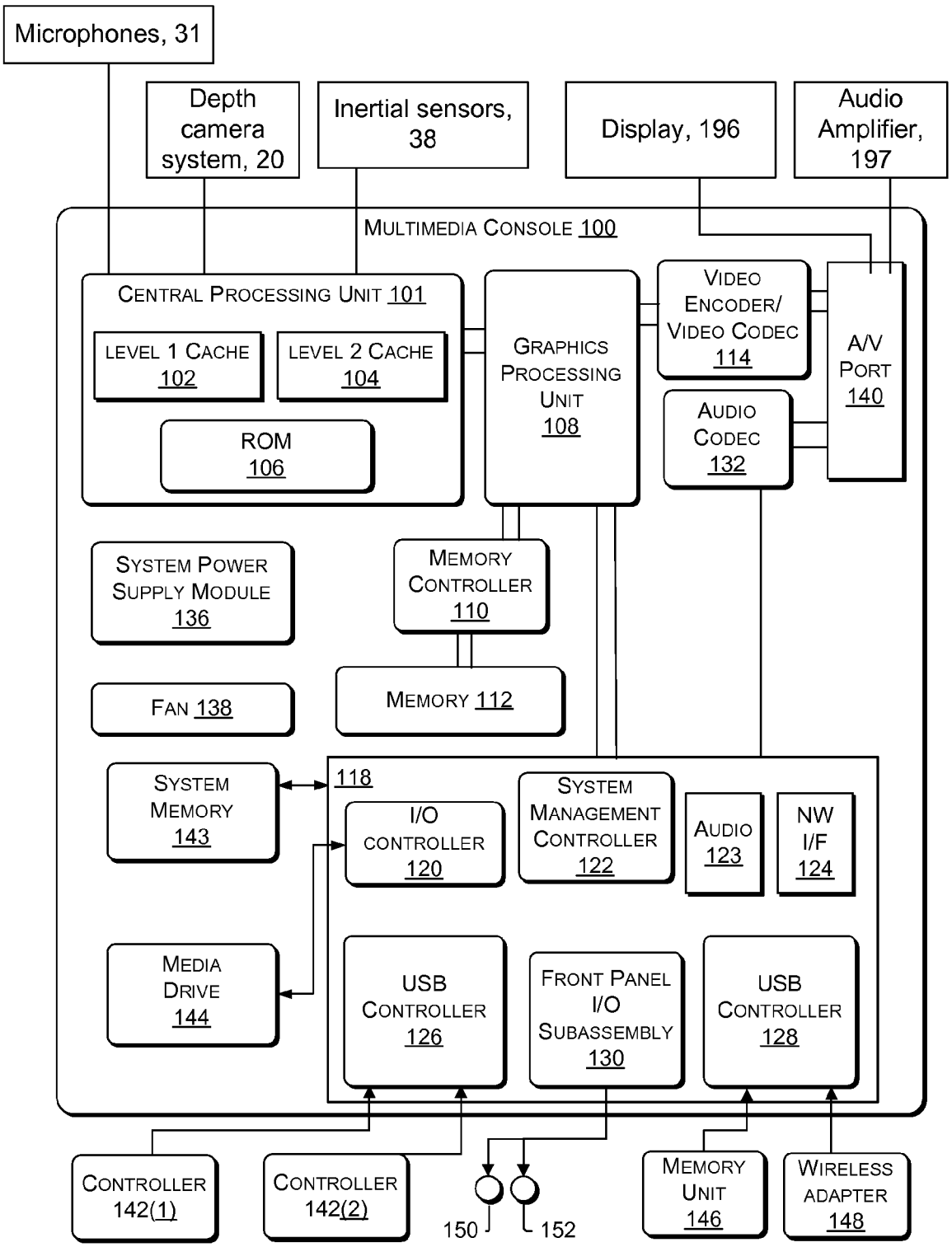
FIG. 11 depicts an example block diagram of a computing environment that may be used in the motion capture system of FIG. 1.

FIG. 11 depicts an example block diagram of a computing environment that may be used to generate 3D audio signals. The computing environment can be used in the motion capture system of FIG. 1. The computing environment such as the computing environment 12 described above may include a multimedia console 100, such as a gaming console.

The console 100 may receive inputs from the depth camera system 20 of FIG. 2. The console 100 may also receive input from microphones 31 and inertial sensors 38, which may both be worn by the user. The console 100 may output a 3D audio signal to the audio amplifier 197.

The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The memory 106 such as flash ROM may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory). The A/V port 140 may be connected to display 196.

The multimedia console 100 includes an I/O controller 120, a system management controller 122, an audio processing unit 123, a network interface 124, a first USB host controller 126, a second USB controller 128 and a front panel I/O subassembly 130 that may be implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface (NW IF) 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities. In some embodiments, the 3D audio signal is provided through the A/V port 140, but the 3D audio signal coiled be provided over a different connection.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation may be large enough to contain the launch kernel, concurrent system applications and drivers. The CPU reservation is may be constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory for an overlay may depend on the overlay area size and the overlay may scale with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications may be scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager may control the switching of input stream, without knowledge the gaming application's knowledge and a driver maintains state information regarding focus switches.

Figure 12:
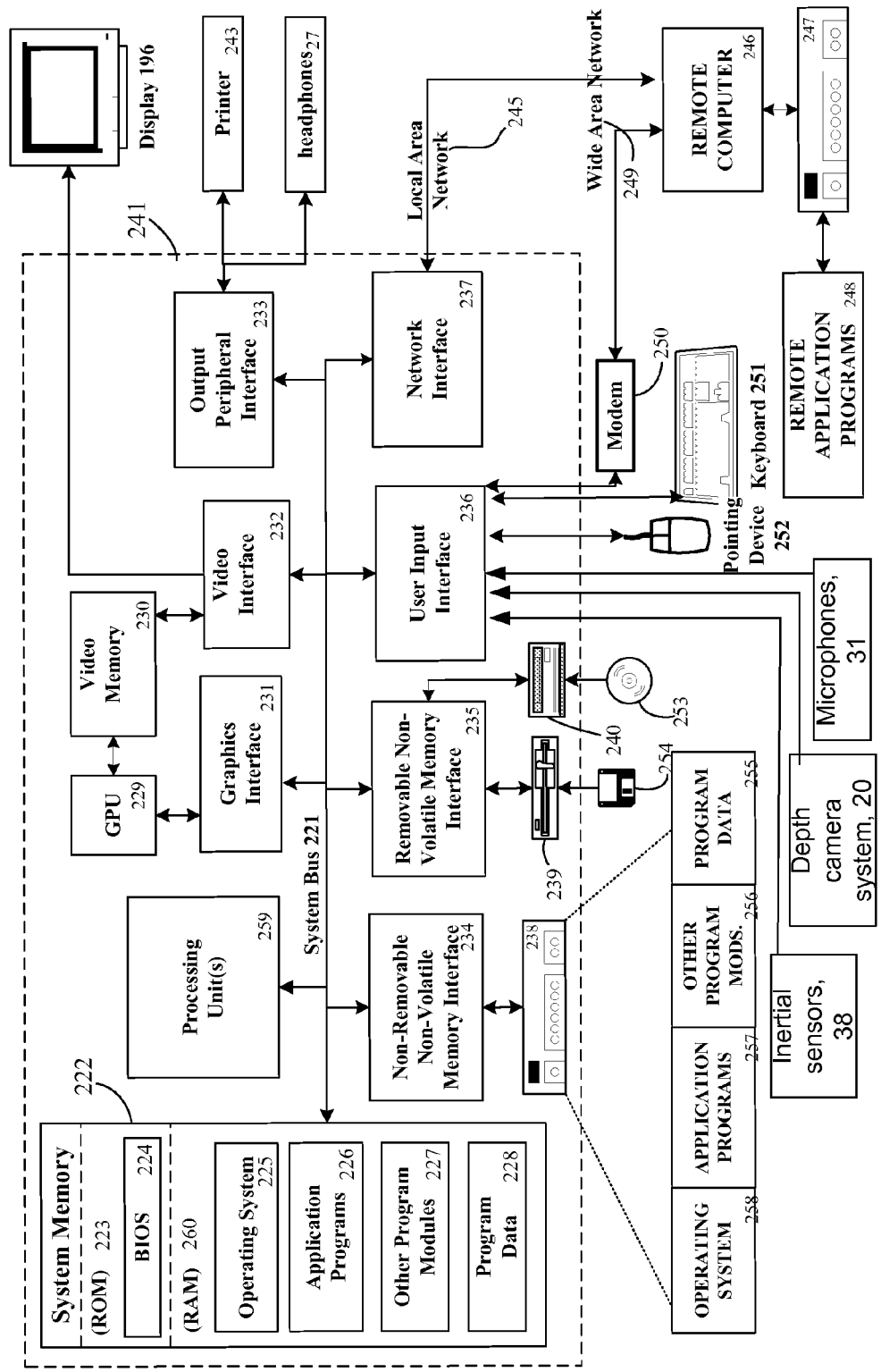
FIG. 12 depicts another example block diagram of a computing environment that may be used in the motion capture system of FIG. 1.

FIG. 12 depicts another example block diagram of a computing environment that may be used to provide a 3D audio signal. The computing environment may receive inputs from the depth camera system 20 of FIG. 2. The computing environment may also receive input from microphones 31 and inertial sensors 38, which may both be worn by the user. The computing environment may output a 3D audio signal to the headphones 27.

The computing environment 220 comprises a computer 241, which typically includes a variety of tangible computer readable storage media. This can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. A graphics interface 231 communicates with a GPU 229. By way of example, and not limitation, FIG. 12 depicts operating system 225, application programs 226, other program modules 227, and program data 228.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile tangible computer readable storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and depicted in FIG. 12, provide storage of computer readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The depth camera system 20 of FIG. 2, including camera 28, may define additional input devices. A display 196 is also connected to the system bus 221 via an interface, such as a video interface 232. In addition to the monitor, computers may also include other peripheral output devices such as headphones 27 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been depicted in FIG. 12. The logical connections include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 12 depicts remote application programs 248 as residing on memory device 247. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method comprising:
   collecting sensor data pertaining to a room and a position of a listener in the room, the sensor data includes depth information pertaining to an ear of the listener;
   determining real physical characteristics of the room based on the sensor data;
   determining virtual physical characteristics of a virtual environment;
   applying the virtual physical characteristics to the real physical characteristics of the room;
   building a model of the room that includes the virtual physical characteristics applied to the real physical characteristics of the room, including replacing real physical characteristics of a real object in the room with virtual physical characteristics of a virtual object from the virtual environment;
   determining a location of the listener in the room based on the sensor data;
   determining physical characteristics of the ear of the listener from the depth information pertaining to the ear of the listener;

determining a head related transfer function (HRTF) for the listener from a library of HRTFs based on the physical characteristics of the ear of the listener; and
determining a 3D audio signal based on the model of the room that includes the virtual physical characteristics applied to the real physical characteristics of the room, the location of the listener in the room, and the HRTF for the listener, determining the 3D audio signal based on the model of the room that includes the virtual physical characteristics applied to the real physical characteristics of the room includes determining how the virtual physical characteristics of the virtual object will affect sound reflections.

2. The method of claim 1, wherein the determining a 3D audio signal includes:
   determining a plurality of sound paths between a virtual sound source and each ear of the listener based on the physical characteristics of the room and the location of the listener in the room.

3. The method of claim 2, wherein the determining the 3D audio signal includes:
   determining a plurality of components of the 3D audio signal, a component is determined for each of the plurality of sound paths; and
   applying the head related transfer function (HRTF) for the listener to each of the plurality of components.

4. The method of claim 1, further comprising estimating materials of objects in the room based on the sensor data, the determining a 3D audio signal is further based on an effect that the materials will have on sound.

5. The method of claim 1, wherein the collecting sensor data includes:
   collecting image sensor data; and
   the determining the location of the listener in the room includes determining the position and a rotation of the listener in the room based on the image sensor data.

6. The method of claim 5, wherein the determining the location of the listener in the room includes tracking the listener's position in the room.

7. The method of claim 1, further comprising:
   storing the physical characteristics of the ear of the listener at a first time;
   identifying the listener based on biometric information at a second time that is later than the first time, the biometric information is other than the physical characteristics of the ear of the listener; and
   selecting the HRTF from the library based on the stored physical characteristics for the ear of the identified listener.

8. The method of claim 1, wherein the sensor data includes sensor data from one or more microphones on the listener.

9. An apparatus, comprising:
   one or more sensors that collect depth information pertaining to a pinna of a listener; and
   a processor coupled to the one or more sensors, the processor collects sensor data pertaining to an environment and the listener using the one or more sensors; the processor determines physical dimensions and locations of real objects in the environment based on the collected sensor data; the processor accesses virtual physical characteristics of a virtual environment from a software application; the processor applies the virtual physical characteristics to the physical dimensions and locations of the real objects to build a model; the processor determines a location of the listener in the environment based on the collected sensor data; the processor determines physical characteristics of the pinna of the listener from the depth information; the processor determines a plurality of components for a 3D audio signal based on the model including the virtual physical characteristics that were applied to the physical dimensions and locations of the real objects in the environment and the location of the listener in the environment, including determining how the virtual physical characteristics that were applied to the physical dimensions and locations of the real objects will affect sound reflections; the processor accesses a library of head related transfer functions (HRTFs) and selects an HRTF for the listener based on the physical characteristics of the pinna of the listener; the processor applies the selected HRTF for the listener to each of the plurality of components; and the processor provides the 3D audio signal.

10. The apparatus of claim 9, wherein the processor estimates materials of objects in the environment based on the collected sensor data; and the processor modifies the components of the 3D audio signal based on a predicted effect that the materials will have on sound.

11. The apparatus of claim 9, wherein the processor determines a position and a rotation of the listener in the environment based on collected sensor data, the one or more sensors includes a depth sensor.

12. The apparatus of claim 9, wherein the processor: stores either the selected HRTF or the physical characteristics of the pinna of the listener at a first time; the processor identifies the listener based on biometric information at a second time that is later than the first time, the biometric information is other than the physical characteristics of the pinna of the listener; and the processor either accesses the stored HRTF or determines an HRTF from the library based on the stored physical characteristics of the pinna for the identified listener.

13. The apparatus of claim 9, wherein the processor determines a plurality of sound paths between a virtual sound source and the listener based on the data that describes physical characteristics of the environment and the location of the listener in the environment, the processor determines one of the components of the audio signal for each of the plurality of sound paths.

14. A method for providing a 3D audio signal, comprising:
   collecting sensor data that includes depth information pertaining to head shape and pinna characteristics of an ear of a listener, that includes depth information pertaining to a room, and that identifies a location of the listener in the room;
   determining physical parameters of the ear of the listener based on the depth information pertaining to the ear of the listener;
   determining a head related transfer function (HRTF) for the listener based on a library of HRTFs, determining the HRTF is based on the determined physical parameters of the ear of the listener and the head shape;
   determining real physical parameters of the room based on the depth information pertaining to the room, including locations and physical dimensions of real objects in the room;
   determining the location of the listener in the room based on the sensor data;
   determining a plurality of sound paths between a virtual sound source and the listener based on the real physical parameters of the room and the location of the listener in the room;
   determining virtual physical characteristics of a virtual environment associated with a video game;
   applying the virtual physical characteristics to the locations and physical dimensions of the real objects of the room, including replacing a first real object of the real objects in the room with a virtual object from the video game;

building a model of the room that includes the virtual physical characteristics applied to the locations and physical dimensions of the real objects, including replacing real physical parameters of the first real object with virtual physical characteristics of the virtual object;

determining a component of a 3D audio signal for each of the plurality of sound paths, the determining is based on the physical parameters of the room and the model of the room, determining a component of the 3D audio signal for a first of the sound paths includes determining how the virtual physical characteristics of the virtual object will affect sound reflections;

applying the HRTF for the listener to each of the components of the 3D audio signal; and providing the 3D audio signal.

15. The method of claim 14, further comprising determining a reverb tail to apply to the 3D audio signal based on selecting at least one reverb tail from a library of stored reverb tails, the selecting is based on the physical parameters of the room.

16. The method of claim 14, further comprising estimating materials of objects in the room based on the depth information pertaining to the room and/or RGB information pertaining to the room, the determining a component of the 3D audio signal is based on a predicted effect that materials on a given sound path will have on sound.

17. The method of claim 14, wherein the determining a head related transfer function (HRTF) includes:

playing a virtual 3D sound for the listener while applying a first HRTF from the library, the first HRTF is selected based on the physical parameters of the ear of the listener;

instructing the listener to indicate an apparent source of the virtual sound;

analyzing effectiveness of the first HRTF; and repeating the playing, the instructing, and the analyzing for one or more additional HRTFs from the library that are selected based on the physical parameters of the ear of the listener.

\* \* \* \* \*